(12) United States Patent
Kim

(10) Patent No.: US 7,804,632 B2
(45) Date of Patent: Sep. 28, 2010

(54) DISPLAY DEVICE USING 1 DIMENSIONAL HOLOGRAM

(76) Inventor: Young-Chul Kim, 328-5 Wonpyung 1-dong, Gumi-city, Kyungsangbuk-do 730-923 (KR)

( * ) Notice: Subject to any disclaimer, the term of this patent is extended or adjusted under 35 U.S.C. 154(b) by 0 days.

(21) Appl. No.: 11/667,000

(22) PCT Filed: Nov. 14, 2005

(86) PCT No.: PCT/KR2005/003852

§ 371 (c)(1),
(2), (4) Date: May 2, 2007

(87) PCT Pub. No.: WO2006/109916

PCT Pub. Date: Oct. 19, 2006

(65) Prior Publication Data

US 2008/0002245 A1   Jan. 3, 2008

(30) Foreign Application Priority Data

Apr. 11, 2005   (KR) .................. 10-2005-0029854

(51) Int. Cl.
*G02B 5/32* (2006.01)
(52) U.S. Cl. ................. 359/15; 359/245; 348/40; 353/30
(58) Field of Classification Search .......... 359/15, 359/24–26, 32, 242, 244, 245, 13, 630; 348/40, 348/41; 345/1.1–3.4, 7–9; 353/30–37, 46–51
See application file for complete search history.

(56) References Cited

U.S. PATENT DOCUMENTS

| | | | |
|---|---|---|---|
| 4,033,665 A | 7/1977 | Firester | |
| 4,566,031 A * | 1/1986 | Kirk | ............... 348/40 |
| 5,400,155 A | 3/1995 | Ueda et al. | |
| 5,483,364 A | 1/1996 | Ishimoto et al. | |
| 6,511,186 B1 * | 1/2003 | Burstyn et al. | ............... 353/76 |
| 6,927,886 B2 | 8/2005 | Plesniak et al. | |

OTHER PUBLICATIONS

International Search Report dated Feb. 17, 2006 (1 page).

* cited by examiner

*Primary Examiner*—Alessandro Amari

(57) ABSTRACT

An image display device using a one-dimensional hologram is disclosed. The image display device includes a light deflection unit which deflects a parallel light ray and adjusts the incident angle of a reconstructing light in sequence, and a one-dimensional hologram optical modulator which reproduces the entire picture by updating each lineal picture in sequence. A one-dimensional hologram is capable of expressing one lineal picture at one time with single axes data. The one-dimensional hologram is updated in synchronization with the incident reproducing light. The input data for a one-dimensional hologram may be computed by an optical calculation method.

5 Claims, 10 Drawing Sheets

DISPLAY DEVICE USING 1 DIMENSIONAL HOLOGRAM

TECHNICAL FIELD

The present invention relates to an image display device using a one-dimensional hologram, and in particular to an image display device using a one-dimensional hologram which reproduces one line image with the information of single axis. The one line image is placed at an infinite distance. And the line image is updated in sequence so that a plane image is displayed. This is compared to a conventional hologram technology which reproduces a three-dimensional image with the information on a two-dimensional plane.

BACKGROUND ART

A one-dimensional hologram represents a line image, so it may be regarded as a special aspect of a two-dimensional hologram. And, equally, it may be deemed as a generalized or a multiplexed expansion of a diffraction lattice. A certain one-dimensional hologram is identical to a common diffraction lattice with a constant lattice period and constant periodic strength. That one-dimensional hologram is formed by interference of two parallel rays of proper incident angles. The two-dimensional image is obtained by sequential scanning of the line images those are expressed by one-dimensional holograms. Therefore, it is naturally appropriate for displaying motion pictures.

There are few studies on the one-dimensional hologram in the past. However, its possibility may be expected by considering the dimension of the information of displaying a picture. It is possible to prove the presence of the one-dimension hologram with calculation. The one-dimensional hologram may be a new useful device for allowing people to see a plane picture. The one-dimensional hologram is more advantageous under certain circumstances as compared to the conventional device.

As one example of the above-described circumstances, there is a HMD (Head Mount Display) application. Because it is a new device, the one-dimensional hologram would be applied to various fields that we have never expected. Here, the one-dimensional hologram will be compared with the conventional art in the field of a HMD type portable display device. In the conventional art, there are a technology of using a common plate display device, a method of deflecting a parallel ray for thereby forming a certain picture, and a conventional hologram method. In the case of using a plate display device, the current motion picture HMD display devices operate in this method. There are currently many applications, but there are many limitations in their image qualities and conveniences.

In a method of deflecting a parallel ray, Fujitsu et al developed a method of forming a diffraction lattice pattern with variable pitches, but it is not practical yet. In this method, there are problems in high resolution displaying due to a limit of displaying speed and a high-order diffraction problem.

In addition, a common two-dimensional hologram method may be deemed as an ultimate method, but it needs very large amount of computational load when computing the hologram data. Too large amount of data is needed to express a common hologram, and it is difficult to manufacture an optical modulator capable of expressing a hologram pattern, for that reason, it is difficult to put to practical use.

DISCLOSURE OF INVENTION

This invention is conceived to solve those problems mentioned above. It is designed to overcome the computational load problem, the data size problem of displaying, and the problem of manufacturing optical modulation device. Those difficulties are encountered when developing a hologram display device. And this invention has an object of providing a practical hologram displaying device. But there is a limitation of two-dimension displaying of an image.

In an image display device, the above object is achieved with providing an improved image display device using a one-dimensional hologram which is able to display one line image at one time. It comprises a light deflection means which deflects a parallel light and adjusts a reproducing light incident angle, and a one-dimensional hologram light modulator which is updated in sequence and synchronized with the deflected parallel reproducing light.

BEST MODE FOR CARRYING OUT THE INVENTION

The picture display device using a one-dimensional hologram according to the present invention will be described with reference to the accompanying drawings.

A common hologram is a record of interference pattern of an object wave and a reference light wave based on a coherent light source.

So as to reproduce a high resolution image which a human cannot recognize a flaw from an interference pattern, the interference pattern should be expressed over a wide range larger than the diameter of the lens of the eye by the pixel unit of 200 nm which is the half of blue light wavelength of about 400 nm. (It is possible to express with a certain resolution lower than 200 nm but there is a certain limit at the position of the reference light).

A hologram having three-dimensional information should be expressed over the entire area. However, a hologram by the parallel rays came from an image formed at an infinite distance can be repeatedly expressed with same hologram pieces of a size of 5 mm×5 mm which is slightly bigger than the diameter of the lens of the eye.

Here, the data amount needed for the above expression is obtained by multiplying brightness data with the squared value of 5 mm/200 nm=25000. When 1 byte is substituted for the brightness data, 625 megabyte of data is needed. However, if one certain line of a plane can be expressed with only one of vertical or horizontal data, when 2500 lines of horizontal are expressed, the data amount needed for expressing the picture is decreased by 1/10 with 25000:2500. Various advantages of the present invention will be described based on the above method.

Figure 1:
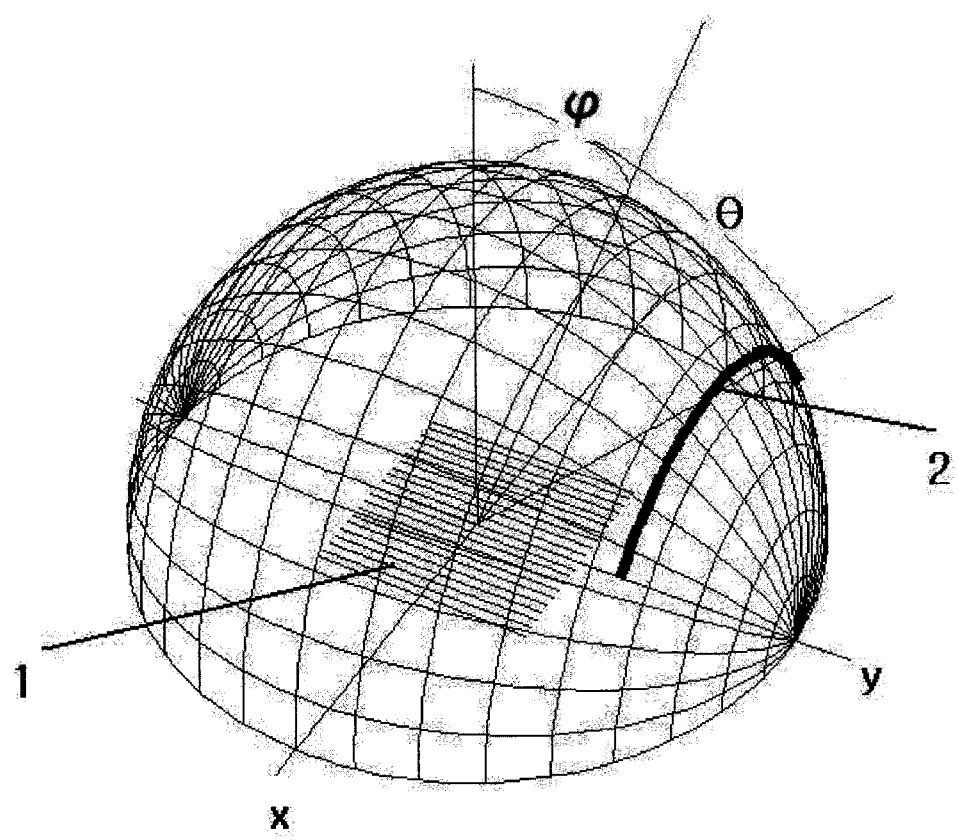
FIG. 1 is a view illustrating an example of a polar coordinate expression of a group of parallel incident rays which forms a one-dimensional hologram according to the present invention.

As shown in FIG. 1, when the dots in the infinite distances are expressed on a spherical polar coordinates with an observer in the center, an interference pattern 1 based on the dots at the same latitude θ as the reference numeral 2 may be fully expressed with a function of "x", assuming that the pole direction is "y", and the equator direction is "x". At a certain point on the plane "xy", a parallel ray incident to the origin point form the latitude "θ" and the longitude "φ" may be expressed as following formula 1 with phase vector method.

$$\sqrt{In}\, e^{-\frac{2\pi j(\cos[\theta]\sin[\phi]x+\sin[\theta]y+\sigma)}{\lambda}}$$

(In=Intensity, λ=wavelength, σ=phase at origin point). When multiple parallel rays are incident and one of the incident rays is the reference light, the light vector at a certain point on the plane "xy" may be expressed in the following formula 2 which is the sum of each light vector.

$$\sum_{i=1}^{n} \sqrt{Ini}\, e^{-\frac{2\pi j(\cos[\theta i]\sin[\phi i]x+\sin[\theta i]y+\sigma i)}{\lambda}}$$

If the value of "θI" is constant, the term "y" may be taken out of the sum of series. According to the calculating method of conventional hologram which expresses only the intensity of light, the magnitude of the taken-out term of axis "y" is constantly 1, with only the phase being changed based on the value of "y". The term of axis "y" changes only the phase of the light vector without affecting the absolute value. Therefore, the hologram data which is the square of the absolute value may be expressed in the following formula 3.

$$\text{Abs}\left[\sum_{i=1}^{n} \left(\sqrt{Ini}\, e^{-\frac{2\pi j(\cos[\theta i]\sin[\phi i]x+\sigma i)}{\lambda}}\right)\right]^2$$

The above formula is a function of only "x". The reference light is included in the computation of the formula as one of the incident lights from the same latitude of "θ".

Figure 2:
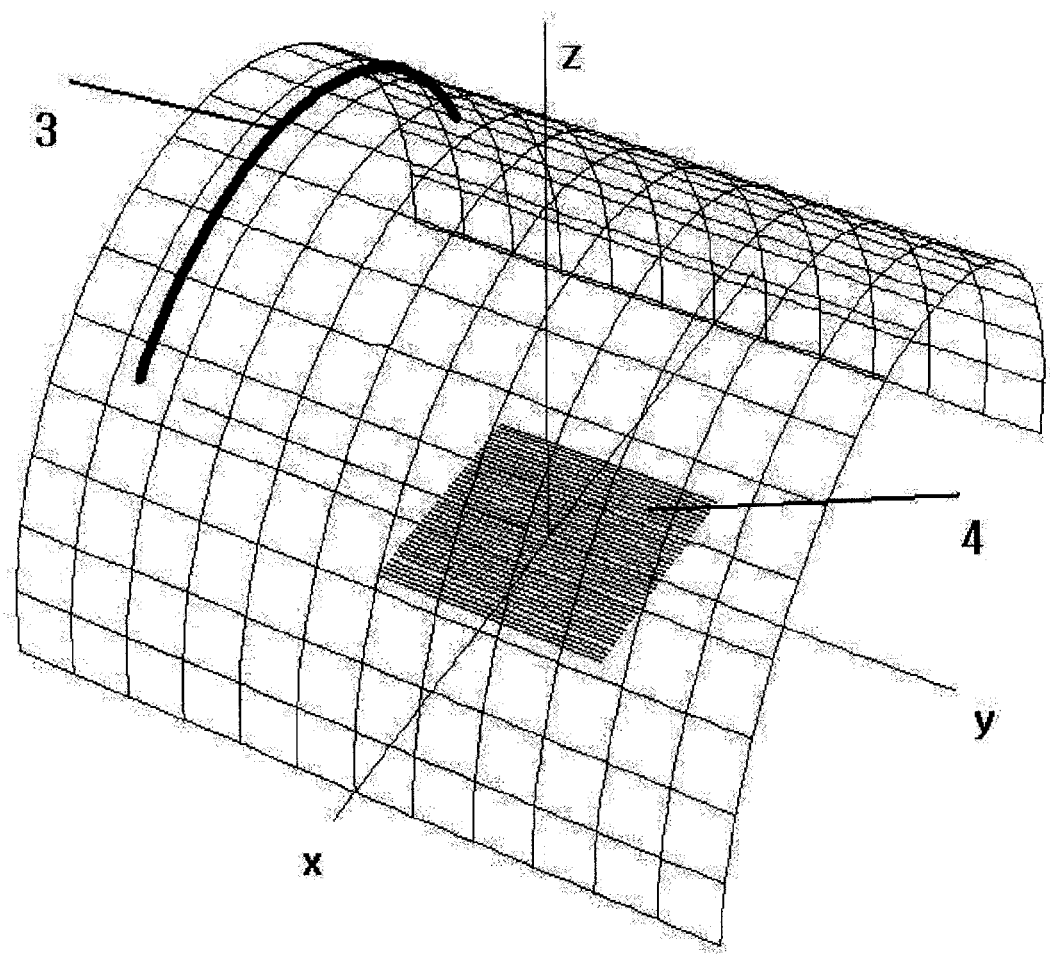
FIG. 2 is a view illustrating a cylindrical coordinate expression of a group of incident rays according to the present invention.

The cylindrical coordinate expression as in FIG. 2 of the formula 2 is in the following formula 4.

$$\sum_{i=1}^{n} \sqrt{Ini}\, e^{-2\pi j\left(\frac{\sin[\theta i]}{\sqrt{\alpha^2+1}}x+\frac{\alpha}{\sqrt{\alpha^2+1}}y+\sigma i\right)}$$

(α=the tangent of the y-axis direction of the incident light, and θ corresponds to φ at the polar coordinate). When α is constant like the reference numeral 3 of FIG. 2, the hologram 4 may be expressed as function of one lo dimension which is only for the value of "x".

Figure 3:
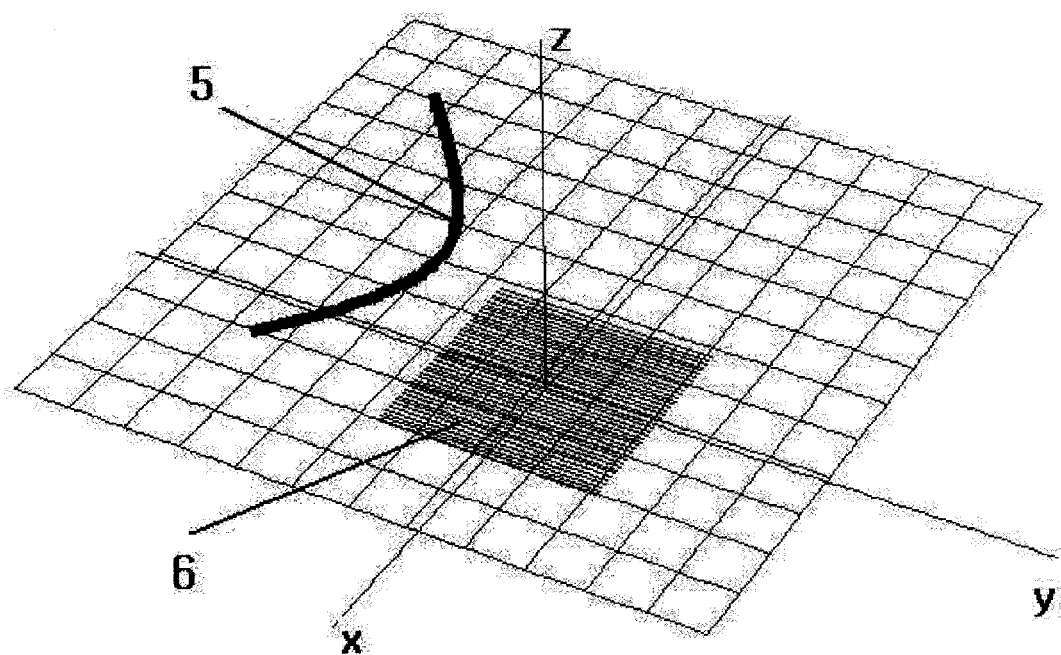
FIG. 3 is a view illustrating a plane projection expression of a group of incident rays according to the present invention.

In the expression of the tangent value, when the curve 5 of FIG. 3 satisfies the condition of the following formula 5, the previous polar coordinate and the cylindrical coordinate expression will have the same condition.

$$\beta = c\sqrt{\frac{1+\alpha^2}{1-c^2}}$$

("c" is constant smaller than 1, α=x-axis direction tangent, β=y-axis direction tangent)

If the spatial optical modulator capable of expressing the phase can be used, the reference light may be excluded in the computation. The constant term of the formula 2 may be extracted as in the following formula 6.

$$e^{-\frac{2\pi j\sin[\theta]y}{\lambda}} \sum_{i=1}^{nn} \sqrt{Ini}\, e^{-\frac{2\pi j(\cos[\theta]\sin[\phi i]x+\sigma i)}{\lambda}}$$

Here, the constant term "y" by "θ" is satisfied with the reference light incident from (θ, 0), and the rear term "x" is computed without the reference light. So, it is possible to fully express the light vector at a specific surface with only the sum of the rear terms of the above formula without the reference light.

Figure 7:
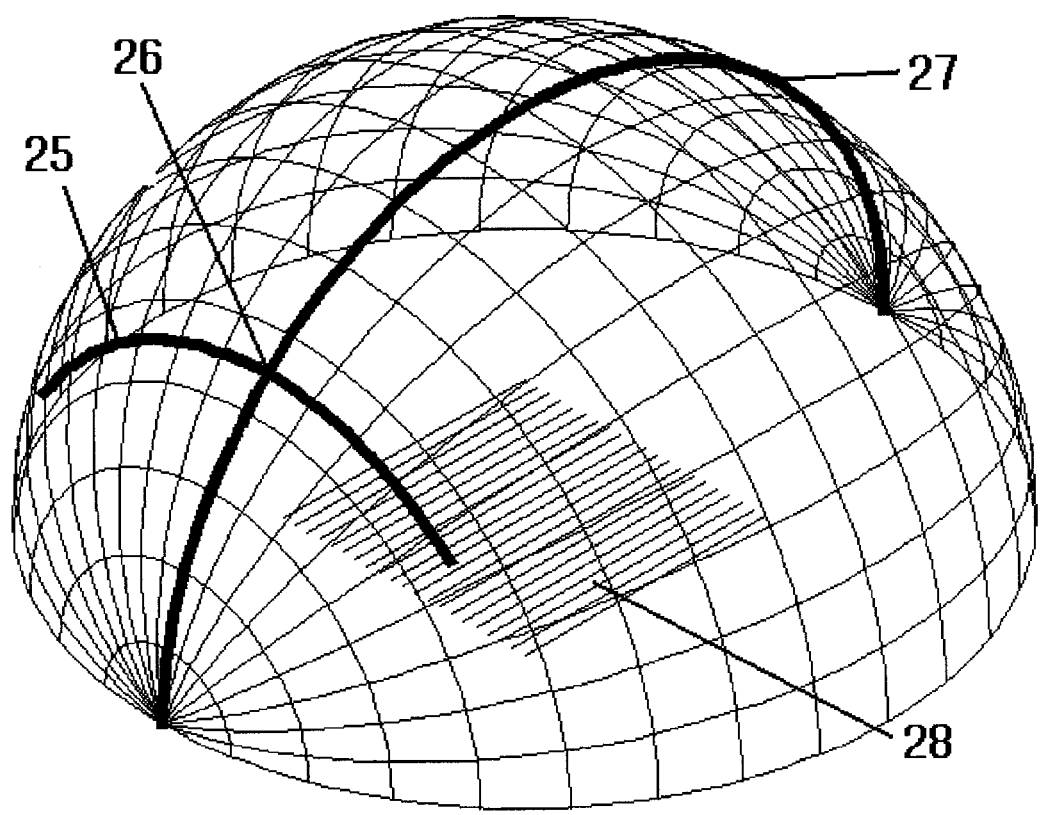
FIG. 7 is a view so as to describe the concepts of a reference ray and a line picture by a display device according to the present invention.

The line of same latitude of "θ" as the reference numeral 25 of FIG. 7 may be displayed with the reference light incident at the angle 26 of FIG. 7. As compared to the previous case, the phase data is not included, it does not need to consider the 0$^{th}$ order term, and its expressible range of view is as wider as the region 27 of FIG. 7 than the regions 14 and 16 of FIG. 5.

In addition to the advantage of the data amount, a further advantage may be obtained in the computational burden when using one-dimensional hologram. When the hologram which represents image of 2000×2000 pixels in vertical and horizontal directions are expressed on the region of 5×5 mm with the resolution 200 nm, even thought the gap may be narrowed based on a computational algorithm, The full conventional hologram needs $2.5 \times 10^{15}$ times of operation with respect to 4 mega picture elements for 625 mega hologram pixels. In one-dimensional hologram method, however, that is reduced to $1 \times 10^{11}$ of operation with respect to 2000 times repetition of the 2000 lineal picture elements for 25000 line elements of one-dimensional hologram. The increase of computational efficiency is about 25000 times in this case. As the resolution increases, the above difference may increase.

Figure 10:
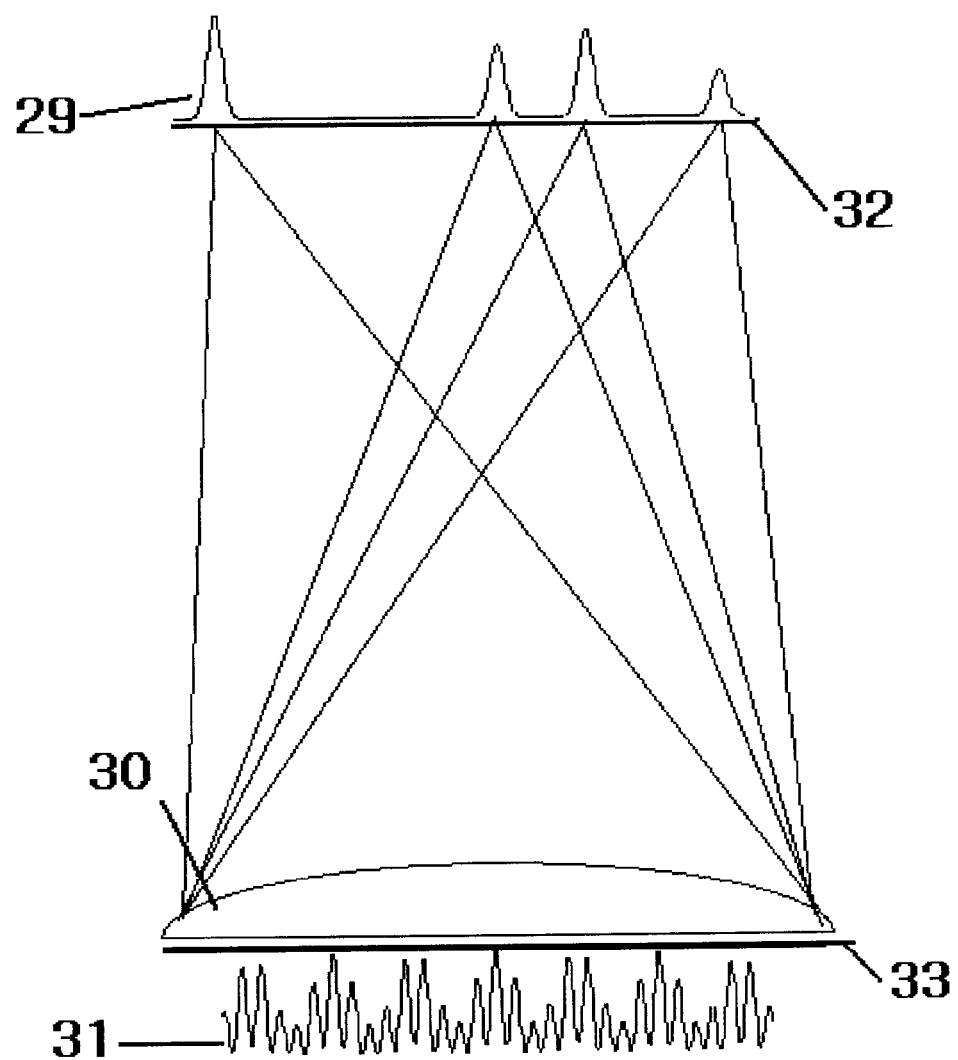
FIG. 10 is a view so as to describe an optical computation device for a one-dimensional hologram according to the present invention.

When the digital method still has a certain load in the computation, a simple optical calculation device of FIG. 10 may be introduced.

When the data 29 of FIG. 10 are converted into the luminance of the dot light sources by the optical modulator 32, and if the aberration is not considered, the data 29 are converted into the group of the parallel incident rays of various incident angles by the lens 30 of FIG. 10.

When the light source input of the optical modulator 32 of FIG. 10 is 10 coherent, an interference pattern is formed at the optical sensor array 33 of FIG. 10. When a certain data 29 is provided to the optical modulator 32, it is directly transformed into the data 31 which is the input data of each 9, 10 and 11 of the one-dimensional hologram display device of FIG. 4.

The above-described processes are performed in parallel for the all expressed picture elements in the optical calculator scheme. The input data should be adjusted based on the following method. Only the exponent of "e" of the formula 3 may be expressed in the following formula 7.

$$-\frac{2\pi j (\cos[\theta i] \sin[\phi i] x + \sigma i)}{\lambda}$$

In this case, since $\cos(\theta i)$ is constant in a one-dimensional hologram calculation, when "θI" is different, it is possible to obtain the same result by properly adjusting "φI". This means that the above optical calculator structure can perform all calculation about all "θI" by adjusting the modulation positions of input data.

In addition, the larger value of "x" that is corresponding to the position of each pixel of the optical sensor is more advantageous when manufacturing the sensor. It is possible to achieve the above result by adjusting "φI" with a smaller value. And, it is more advantageous because the paraxial rays decreases the aberrations. The above structure is well adapted to the one-dimensional hologram, because it can decrease the thickness as it needs a structure of only two dimensions for one-dimensional hologram.

The Fourier transforming optical calculation structure of FIG. 10 is well known nature of lens, but it is more appropriate for the one-dimensional hologram computation. When it is adapted to a common hologram computation, the thickness and aberration problems may decrease its practical use.

In addition to the data size and computation load, there is further another advantage. Namely, it is easy to fabricate the optical modulator. In the case of the optical modulator capable of displaying a complete hologram on the 5×5 mm region with the voltage-driven method, a voltage controlling structure should be embodied with 625 mega pieces of capacitances and 625 mega pieces of switching transistor for 25000 x-axis rows and 25000 y-axis columns. In addition, 25000 transistor driving wires are needed in minimum.

However, an optical modulator for one-dimensional hologram needs only the 25000 wires for one of axis lines in the internal structure, the capacitances are plentiful, and the transistors do not need to be placed in the display region.

Figure 4:
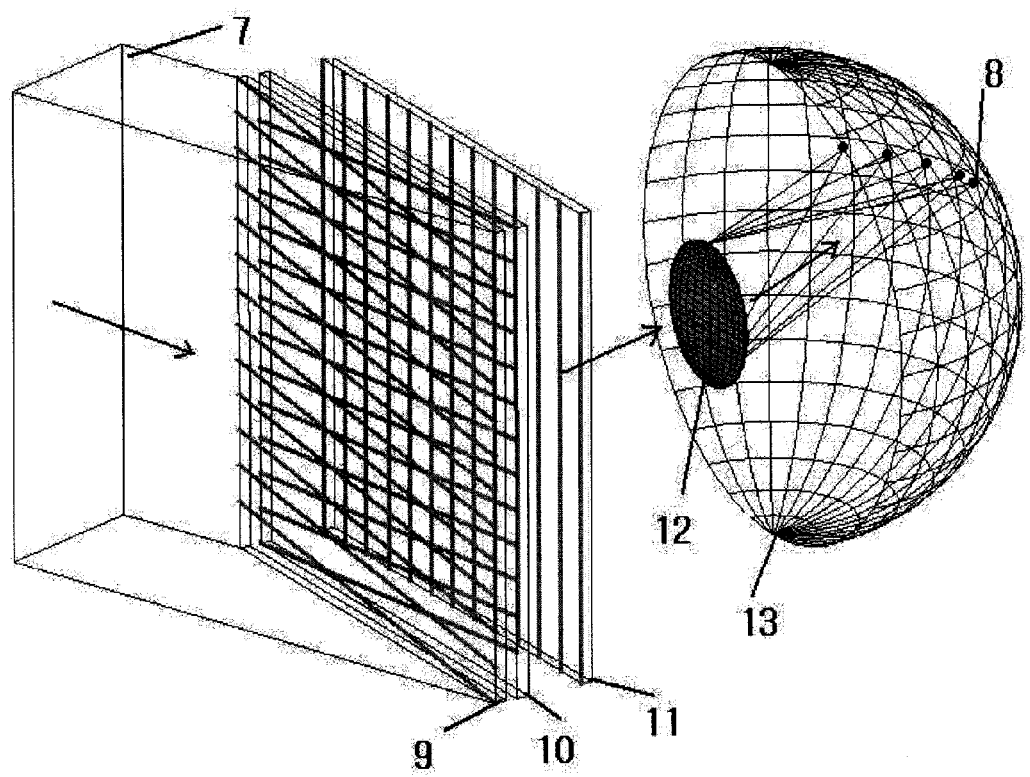
FIG. 4 is a view illustrating a structure of a display device using a one-dimensional hologram according to the present invention.

The one-dimensional hologram image display device may be constituted as shown in FIG. 4.

As indicated by the reference numeral 7 of FIG. 4, the fixed incident reference light is deflected by one of the one-dimensional hologram deflectors 9 or 10 of FIG. 4, consequently, the image will be seen through the one-dimensional hologram 11. The deflectors 9 and 10 are arranged as slant lines cross each other. It may be formed with single deflector. But, when one deflector is used, the field of view becomes narrower than that of two. It is possible to replace one sheet of the two deflectors with the volume hologram as a variation.

Figure 5:
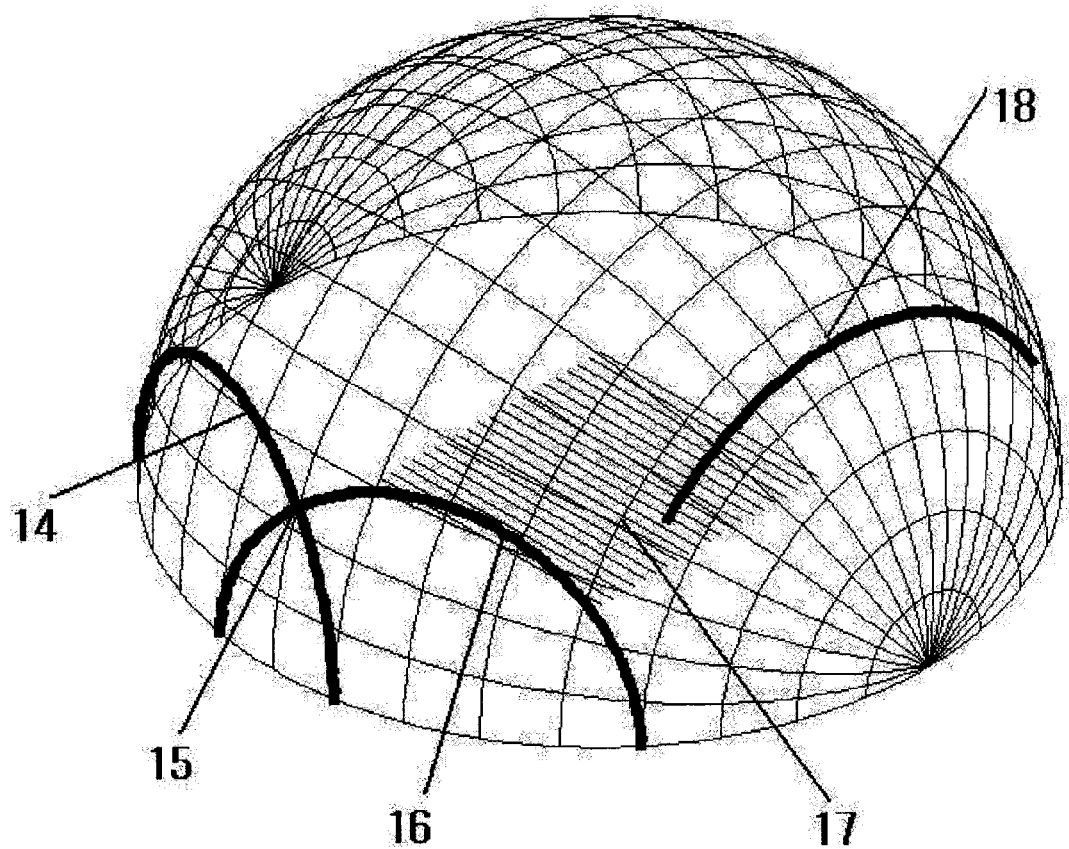
FIG. 5 is a view so as to describe the concepts of a reference ray and a line picture by a one-dimensional hologram display device according to the present invention.
Figure 8:
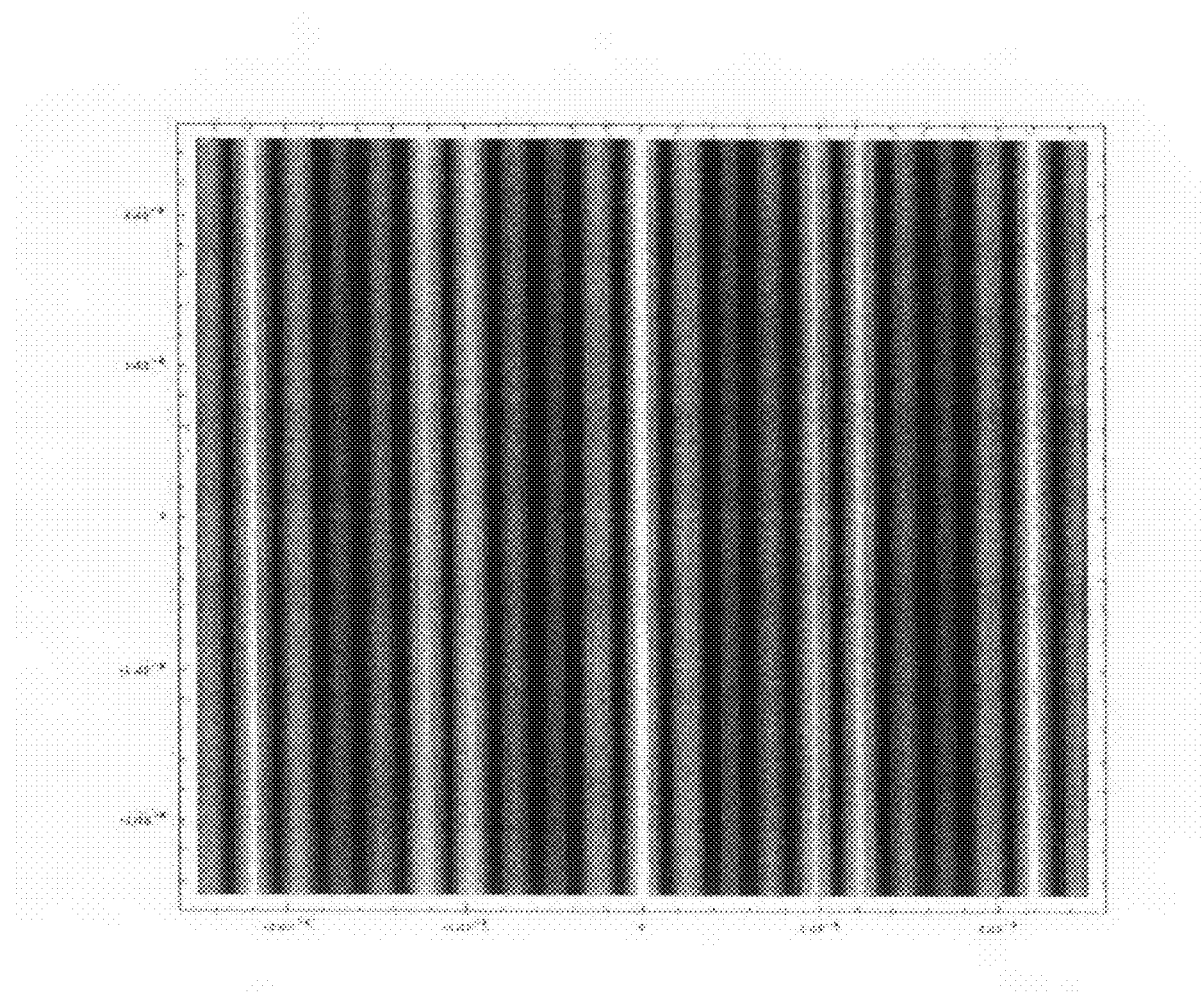
FIG. 8 is an enlarged view illustrating a one-dimensional hologram formed on an optical modulator according to the present invention.
Figure 9:
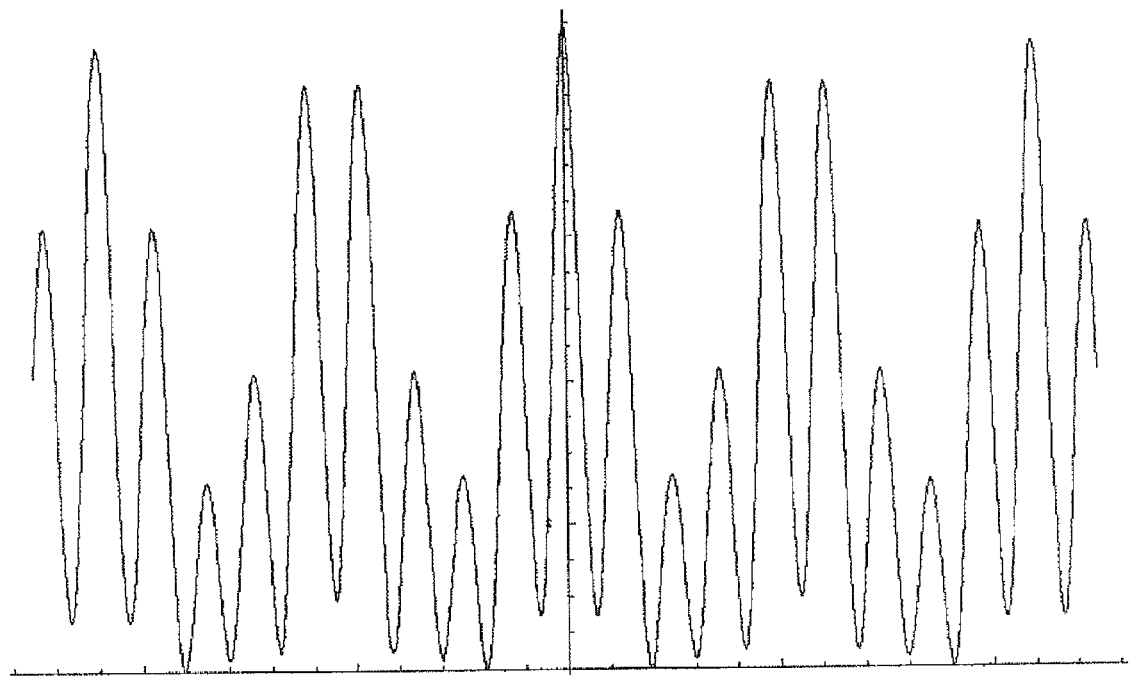
FIG. 9 is a strength graph of the brightness which has transmitted a hologram according to the present invention.

The angular ranges that each deflector can deflect are indicated by the numeral references 14 and 16 of FIG. 5 when the incident reference light is incident at the angle 15 of FIG. 5. For the safety of eyes, the reference ray is removed using the total internal reflection phenomenon at the inner surface of the observer side of the hologram 11 of FIG. 4. When one of the deflector operates, the other deflector maintains a transparent state. When indicating the horizon, both of the deflectors concurrently maintain the transparent state. Here, the slant line structures of the two deflectors do not need to be always symmetrical. But, actually, the symmetrical structure is preferred to obtain the maximum field of view. The pattern of FIG. 8 may be observed at an enlarged one-dimensional hologram 11 of FIG. 4, and FIG. 9 is a graph of the brightness data of it.

A concave lens may be inserted between the reference numeral 11 of FIG. 4 and the eyes of the observer for a myopia person. An electronic optical shutter may be placed in front of the deflection plate for enhancing the clearness of a picture, and when watching only the images reproduced by the display device.

It is possible to use a LCD as an optical shutter to compensate for the brightness difference between the edge and the center. In addition, it is better when the optical shutter is designed to be able to adjust its aperture as demands. To decrease the noise of the picture, the pulsed reference light may be used when hologram updating.

The colors are expressed by updating the color of the reference light with the three primary colors. The field of view is limited as the reference numerals 14 and 16.

Figure 6:
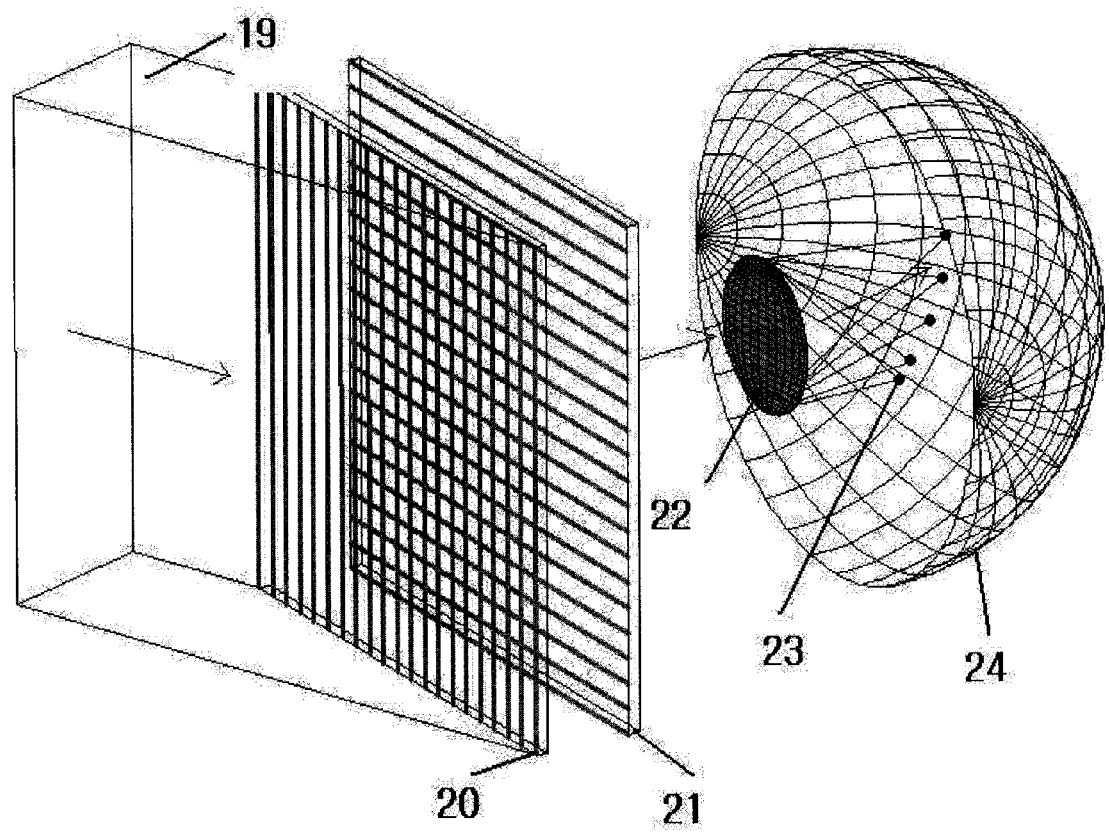
FIG. 6 is a view illustrating a structure of a display device which uses an optical modulator capable of expressing the phase according to the present invention.

FIG. 6 is a view illustrating the construction when the used optical modulator is capable of expressing phases. Here, only one sheet of the deflectors becomes enough. The vertical and horizontal relationship of the one-dimensional hologram and the reference light is changed. Since the incident angle of the reference light may be chosen from the line 27, the color updating scheme becomes simple. The field of view becomes limitless.

INDUSTRIAL APPLICABILITY

As described above, the image display device using a one-dimensional hologram can be well applied to a glasses type portable display device and a display device for the home theater which virtually shows an extra-large screen.

As the present invention may be embodied in some modified forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. In a video display device, an improved image display device using a one-dimensional hologram, comprising:
a light deflection means which sequentially deflects a parallel ray and adjusts a reproducing light incident angle to a one-dimensional hologram; and
a one-dimensional hologram light modulation means which expresses one line picture at one time with single axes data, and reproduces an entire picture by sequentially updating each lineal picture in synchronization with the adjusted incident reproducing light.

2. The device of claim 1, wherein said light deflection means changes an incident angle with respect to a hologram using two deflection plates arranged in a structure that two deflection plates are crossed at slant angles.

3. The device of claim 1, wherein said light deflection means changes an incident angle with respect to a hologram using one deflection plate and one volume hologram.

4. The device of claim 1, wherein said light deflection means changes an incident angle with respect to a hologram using one deflection plate and one reflection volume hologram.

5. The device of claim 1, wherein said light modulation means computes a one-dimensional data using an optical calculator, which includes:
a lens which modulates coherent lights into multiple collimated lights, with the coherent light being modulated and spread in accordance with a video signal; and
an optical sensor which reads an interference pattern by the collimated lights and supplies the read data to the light modulation means.

* * * * *